United States Patent [19]

Brandinger

[11] 4,418,407
[45] Nov. 29, 1983

[54] VIDEO DISC PICKUP STYLUS

[75] Inventor: Jay J. Brandinger, Indianapolis, Ind.

[73] Assignee: RCA Corporation, New York, N.Y.

[21] Appl. No.: 327,079

[22] Filed: Dec. 3, 1981

[51] Int. Cl.³ .......................... G11B 11/06; G11B 3/44
[52] U.S. Cl. ...................................... 369/126; 369/173
[58] Field of Search ..................... 358/342, 340, 328; 369/126, 173, 174; 274/38

[56] References Cited

U.S. PATENT DOCUMENTS

| 3,783,196 | 1/1974 | Stanley | 179/100.1 B |
| 3,842,194 | 10/1974 | Clemens | 178/6.6 A |
| 3,872,241 | 3/1975 | Adler et al. | 178/6.6 A |
| 3,930,117 | 12/1975 | Clemens et al. | 178/6.6 R |
| 4,013,830 | 3/1977 | Pinch et al. | 358/128 |
| 4,052,738 | 10/1977 | Hosomi et al. | 358/128 |
| 4,162,510 | 7/1979 | Keizer | 358/128 |
| 4,282,268 | 7/1981 | Priestley et al. | 427/39 |

FOREIGN PATENT DOCUMENTS 56-58147  5/1981  Japan ................................. 369/126

Primary Examiner—Robert L. Richardson
Attorney, Agent, or Firm—Birgit E. Morris; Joseph D. Lazar

[57] ABSTRACT

A playback stylus adapted for use in recovering information recorded in an information disc record which acts as a first conductive plate of a capacitor. The stylus includes a body of a first dielectric material having a first dielectric constant, a first layer of a second dielectric material having a dielectric constant less than the first dielectric constant overlaying the body, a second conductive layer overlaying the second dielectric material which acts as a second conductive plate of a capacitor, and a third layer of a dielectric material having a dielectric constant less than the first dielectric constant overlaying the conductive layer.

8 Claims, 2 Drawing Figures

VIDEO DISC PICKUP STYLUS

This invention relates to capacitive information disc playback stylus.

BACKGROUND OF THE INVENTION

U.S. Pat. No. 3,842,194 of Clemens discloses an information recording and playback system which utilizes variable capacitance pickup. In one configuration, information representative of picture and sound is encoded in the form of a relief pattern in a relatively fine spiral groove on the surface of a disc record. For example, a groove width about 2.6 micrometers and groove depth of about 0.5 micrometer may be used. During playback, a pickup stylus, also called a playback stylus, about 2 micrometers wide having a thin conductive electrode thereon, for example, about 0.2 micrometer thick, engages the groove of the disc record as it is rotated by a supportive turntable. Capacitive variations between the stylus electrode and the record surface are sensed to recover the prerecorded information.

Keizer in U.S. Pat. No. 4,162,510 discloses a novel keel-tipped pickup stylus structure. The keel-tipped stylus comprises a dielectric support element having a body, a constricted terminal portion, and shoulders interconnecting the body with the constricted terminal portion. The electrode surface is remote from the prow end of the stylus.

Other systems have been developed which utilize information disc records which do not contain grooves. Instead, signals are encoded in the disc record surface which guides the pickup stylus during playback.

A problem which can occur during playback using either a grooved or nongrooved disc record is the interference of low frequency signals associated with the audio signals with the video signals. This low frequency interference, called sound beat interference, causes the picture quality to degrade and the picture to break up.

One method of overcoming this problem is disclosed in Clemens et al., U.S. Pat. No. 3,930,117. In the Clemens et al. patent the metal electrode layer on the dielectric support element is overcoated with a dielectric layer which serves to balance the fringing capacitance dielectric path through the dielectric support element. It is believed that imbalance between the path through the dielectric support element and the path through the air in the absence of the dielectric layer contributes to the observed sound beat interference.

In the copending application of Mindel, entitled "Video Disc Playback Stylus," Ser. No. 245,715, filed Mar. 20, 1981, the sound beat problem is also addressed. Mindel oxidizes the outer portion of the conductive metal electrode layer. The oxidized metal layer serves to improve the balance of the dielectric paths.

In the copending application of Rose, entitled "Capacitive Information Systems" Ser. No. 208,983, filed Nov. 21, 1980, and now U.S. Pat. No. 4,371,961 the angle between the electrode surface and the disc record surface is other than 90 degrees in order to balance the dielectric paths between the disc record surface and the electrode, both in the direction of relative motion and in the direction opposite the direction of relative motion.

It would be desirable to have an alternative capacitive pickup information disc playback stylus structure for improving the quality of the signal recovered from the capacitive disc record.

SUMMARY OF THE INVENTION

I have found a playback stylus adapted for use in recovering information recorded in an information disc record which acts as a first conductive plate of a capacitor. The stylus includes a body fabricated from a first dielectric material having a first dielectric constant, a layer of a second dielectric material having a dielectric constant less than the first dielectric constant overlaying the body, a second conductive layer overlaying the second dielectric material which acts as a second conductive plate of the capacitor, and a third layer of a dielectric material having a dielectric constant less than the first dielectric constant overlaying the conductive layer.

DETAILED DESCRIPTION OF THE INVENTION

Figure 1:
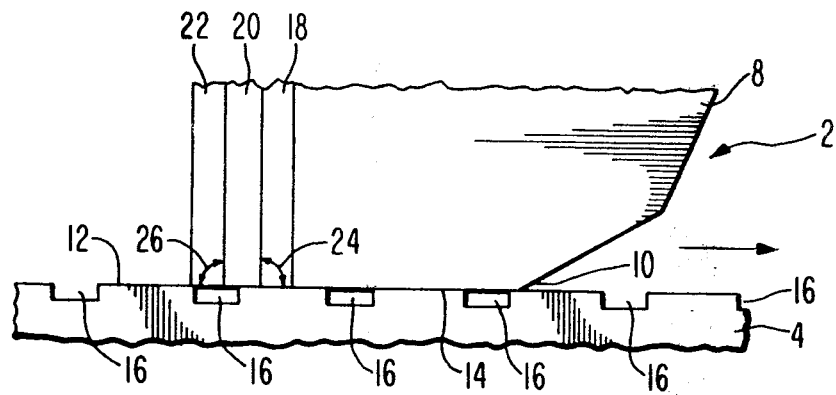
FIG. 1 is a schematic view of a first playback stylus for capacitively recovering information from an information disc record.

The invention may be illustrated by means of the Drawing. FIG. 1 is a schematic view of a first embodiment of a stylus 2 for capacitively recovering information from an information disc record 4. The direction of relative motion between the stylus 2 and the disc record 4 is shown by an arrow. The stylus 2 includes a dielectric support element 8 which is generally fabricated out of a hard crystalline material such as diamond or sapphire. The prow 10 is in the front of the stylus 2 and is the leadng edge of the bottom surface 14 of the stylus 2 which rests on the top surface 12 of the information disc record 4. The stylus's bottom surface 14 and the information disc record top surface 12 may be in contact, or may be separated by air, a lubricant layer or a dielectric, not shown. The lubricant may be a polysiloxane which can be applied by evaporation, spraying, or other convenient methods. The dielectric may be a polystyrene which can be applied by glow discharge deposition or other methods known in the art.

Audio and video information can be encoded in the information disc record top surface 12 as a series of pits 16. As the stylus 2 and a portion of the capacitive information disc record top surface 12 approach each other, the pits 16 representative of the information recorded in the disc record 4, are sensed by means of the stylus electrode 20 as capacitance variations. The stylus electrode 20 senses these capacitance variations from pits 16 directly under it as well as the pits 16 approaching or moving away from the stylus electrode 20.

The stylus electrode 20 may be a conductive metal layer such as titanium or hafnium which is about 2,000 angstroms thick. The metal layer can be deposited, for example, by evaporation. The width of the stylus electrode should be sufficiently thin to resolve the information track pits 16.

It is believed that when the angle between the stylus electrode 20 and disc record top surface 12 is approximately 90 degrees, the stylus electrode 20 more strongly senses the approaching recorded information than the receding information, as determined by the direction of relative motion, when the electrode 20 is directly bonded to the dielectric support element 8. The ratio of the forward directed electric field lines to the backward directed field lines is influenced by the separation between the stylus electrode and the disc. The smaller the separation, the larger the fraction of field lines that pass through the support element and vice versa. The net effect of the unequal fractions of forward and backward directed field lines is to cause the stylus electrode to sense the modulation on the disc at a position not directly under the electrode but skewed toward the more concentrated field lines, in this case in the direction of the support element. The amount of skewing is affected by the stylus electrode-disc separation. If this separation changes, the degree of skewing changes and the signals read from the disc suffer a resultant phase modulation. The audio signal recorded on the disc causes the stylus electrode-disc separation to vary, i.e., degree of skewness at the frequency of the audio FM carrier. This in turn causes the video readout signal to undergo phase modulation, which appears as sound beat in the resultant playback picture.

In order to correct this problem, I sandwich the stylus electrode 20 between two dielectric layers 18 and 22 having dielectric constants lower than that of the dielectric support element 8. The electrode surface 20 is isolated from the dielectric support element 8 by a first dielectric layer 18 having a dielectric constant smaller than that of the dielectric support element 8. A second dielectric layer 22 also having a dielectric constant smaller than that of the dielectric support element 8 overlays the stylus electrode 20 on the opposite side so that the conductive electrode 20 is sandwiched between two dielectric layers having dielectric constants less than that of the dielectric support element 8. The thicknesses of the first dielectric layer 18 and the second dielectric layer 22 are preferably chosen so that the signal recovered is no longer skewed. A thickness of the first dielectric layer 18 greater than that 1,000 angstroms should provide substantial isolation from the capacitive effects of the dielectric support element 8.

The dielectric constants of the materials which are pertinent are those at the frequency at which information is recovered from the information disc record 4. Generally, a frequency of about 900 megahertz (MHz) is employed.

The first dielectric path 24 between the stylus electrode 20 and the record top surface 12 is in the direction of relative motion—that is, in that portion of the record top surface 12 in which the pits 16 are approaching the stylus electrode 20. The second dielectric path 26 between the stylus electrode 20 and the record top surface 12 is in the direction opposite that of relative motion—that is, the pits 16 are receding from the stylus electrode 20. As previously discussed, the dielectric constant and the thickness of the first dielectric layer 18 should preferably be such that when compared to the dielectric constant and the thickness of the second dielectric layer 22 the result is a balance of the dielectric paths 24 and 26. The isolation of the conductive layer 20 from the dielectric support element 8, which has a relatively high dielectric constant compared to the first dielectric layer 18, and the second dielectric layer 22, allows a greater voltage to be applied between the electrode 20 and the record top surface 12 which can lead to a greater signal-to-noise ratio for the recovered signal.

Figure 2:
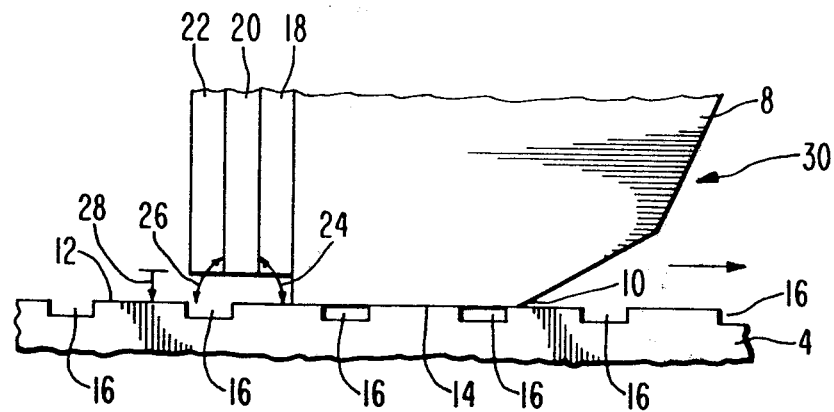
FIG. 2 is a schematic view of a second stylus for capacitively recovering information from an information disc record.

FIG. 2 is a schematic view of a second embodiment of a stylus 30 for recovering information from an information disc record 4. Like numbers are used for like elements of styli 2 and 30. The stylus 30 differs from the stylus 2 in that the first dielectric layer 18, the stylus electrode 20, and the second dielectric layer 22 are stepped back from the stylus bottom surface 14. This stepback is done in order to minimize arcing, field emission or tunneling between the stylus electrode 20 and the information disc record top surface 12 which cause electron transport that results in noise generation by increasing the dielectric separation. The distance chosen may be empirically determined by finding the distance which allows optimum signal recovery from the information disc record 4 while minimizing noise generation. Generally, the stepback distance is less than 100 angstroms. The stepback can be produced, for example, by lapping the stylus 30 after the dielectric layers 18 and 22 and the conductive layer 20 have been deposited. Another possible procedure for producing the stepback is by masking during layer formation.

The adhesion between the dielectric layers 18 and 22 and the dielectric support element 8 or the stylus electrode 20 should be sufficient for the playback stylus to have a long lifetime. Generally, a good lattice match between the first dielectric layer 18 and the dielectric support element 8 ensures good adhesion.

For a diamond dielectric support element 8 having a dielectric constant of about 4.5 at 900 MHz, silicon oxide having the chemical formula $SiO_x$ wherein x is between about 1 and 2, and a dielectric constant of about 1.5 may be advantageously employed for the first dielectric layer 18 and the second dielectric layer 22. The silicon oxide may be prepared by means of a glow discharge deposition process such as that described in Priestley et al., U.S. Pat. No. 4,282,268. A suitable value for the thicknesses of both dielectric layers 18 and 22 is about 1,000 angstroms.

Other embodiments of the present invention will be apparent to one of ordinary skill in the art.

I claim:

1. A playback stylus adapted for use in capacitively recovering information recorded as a series of geometric variations in the surface of an information disc record which acts as a first conductive plate of a capacitor wherein the stylus comprises:
   a body comprising a first dielectric material having a first dielectric constant,
   a first layer of a second dielectric material having a dielectric constant less than said first dielectric constant overlaying the body,
   a second conductive layer overlaying the first layer which acts as a second conductive plate of a capacitor, and
   a third layer of a dielectric material having a dielectric constant which is less than said first dielectric constant overlaying the conductive layer.

2. A playback stylus in accordance with claim 1 wherein the dielectric layers are made of the same material.

3. A playback stylus in accordance with claim 2 wherein said material is $SiO_x$, wherein x is between about 1 and 2.

4. A playback stylus in accordance with claim 1 wherein the first dielectric material is diamond.

5. A playback stylus in accordance with claim 1 wherein the first layer, the conductive layer and the third layer are stepped back from a bottom surface of the body.

6. A playback stylus in accordance with claim 5 wherein the distance stepped back is less than 100 angstroms.

7. A playback stylus in accordance with claim 1 wherein the thickness of the first layer is at least about 1,000 angstroms.

8. A playback stylus in accordance with claim 1 wherein the conductive layer is a metal.

* * * * *